United States Patent
Abraham et al.

(10) Patent No.: US 8,725,196 B2
(45) Date of Patent: May 13, 2014

(54) BEACON AND MANAGEMENT INFORMATION ELEMENTS WITH INTEGRITY PROTECTION

(75) Inventors: Santosh Paul Abraham, San Diego, CA (US); Avinash Jain, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/288,696

(22) Filed: Nov. 3, 2011

(65) Prior Publication Data

US 2012/0289192 A1 Nov. 15, 2012

Related U.S. Application Data

(60) Provisional application No. 61/410,745, filed on Nov. 5, 2010.

(51) Int. Cl.
*H04M 1/00* (2006.01)

(52) U.S. Cl.
USPC ......... 455/550.1; 455/410; 455/411; 370/338

(58) Field of Classification Search
USPC ......... 455/410, 411, 550.1; 380/270; 370/338
See application file for complete search history.

(56) References Cited

U.S. PATENT DOCUMENTS

| | | | |
|---|---|---|---|
| 7,055,086 B2 | 5/2006 | Lam | |
| 7,558,960 B2 | 7/2009 | Cam Winget et al. | |
| 8,010,780 B2 | 8/2011 | Sood et al. | |
| 8,014,307 B2 | 9/2011 | Vialen et al. | |
| 2005/0114489 A1 | 5/2005 | Yonge, III | |
| 2008/0046758 A1* | 2/2008 | Cha et al. | 713/189 |
| 2008/0049703 A1* | 2/2008 | Kneckt et al. | 370/342 |
| 2008/0063204 A1* | 3/2008 | Braskich et al. | 380/270 |
| 2008/0063205 A1* | 3/2008 | Braskich et al. | 380/270 |
| 2008/0170552 A1* | 7/2008 | Zaks | 370/338 |
| 2008/0287069 A1 | 11/2008 | Yoshimura | |
| 2009/0235077 A1* | 9/2009 | Cam Winget et al. | 713/171 |
| 2011/0176043 A1 | 7/2011 | Baker et al. | |
| 2011/0176534 A1* | 7/2011 | Subramanian et al. | 370/350 |

FOREIGN PATENT DOCUMENTS

EP     2117149 A1    11/2009

OTHER PUBLICATIONS

International Search Report and Written Opinion—PCT/US2011/059398—ISA/EPO—Apr. 24, 2012.

\* cited by examiner

*Primary Examiner* — Danh Le
(74) *Attorney, Agent, or Firm* — Dang M. Vo

(57) ABSTRACT

Certain aspects of the present disclosure relate to protecting integrity of transmitted messages in a wireless communications.

44 Claims, 7 Drawing Sheets

| FC | Dur | Add1 DA | SA | BSSID | Seq CTL | Frame Body | FCS |

FIG. 4

| 802.11 Header | Mgmt Frame Body Including MMSE | FCS |

FIG. 5

| Element ID | Len | KeyID | IPN | MIC |

FIG. 6

BEACON AND MANAGEMENT INFORMATION ELEMENTS WITH INTEGRITY PROTECTION

CROSS-REFERENCE TO RELATED APPLICATIONS

This application claims benefit of U.S. Provisional Patent Application Ser. No. 61/410,745, filed Nov. 5, 2010, herein incorporated by reference.

BACKGROUND

1. Field

Certain aspects of the present disclosure generally relate to wireless communications and, more particularly, to protecting the integrity of certain wireless transmissions.

2. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single access point and multiple user stations, concurrent transmissions may occur on multiple channels toward different stations, both in the uplink and downlink directions. Many challenges are present in such systems.

SUMMARY

Certain aspects provide a method for wireless communications. The method generally includes generating an integrity check value for at least one information element (IE) to be encapsulated in an integrity protected information element (IE) and transmitting a message comprising the at least one integrity protected IE and the integrity check value.

Certain aspects of the present disclosure provide an apparatus for wireless communications. The apparatus generally includes means for generating an integrity check value for at least one information element (IE) to be encapsulated in an integrity protected information element (IE) and means for transmitting a message comprising the at least one integrity protected IE and the integrity check value.

Certain aspects of the present disclosure provide an apparatus for wireless communications. The apparatus generally includes a processing system configured to generate an integrity check value for at least one information element (IE) to be encapsulated in an integrity protected information element (IE), and a transmitter configured to transmit, via the at least one antenna, a message comprising the at least one integrity protected IE and the integrity check value.

Certain aspects of the present disclosure provide a computer-program product for wireless communications. The computer-program product includes a computer-readable medium comprising instructions executable to generate an integrity check value for at least one information element (IE) to be encapsulated in an integrity protected information element (IE) and transmit a message comprising the at least one integrity protected IE and the integrity check value.

Certain aspects of the present disclosure provide an access point. The access point generally includes at least one antenna, an integrity check generator configured to generate an integrity check value for at least one information element (IE) to be encapsulated in an integrity protected information element (IE), and a transmitter configured to transmit, via the at least one antenna, a message comprising the at least one integrity protected IE and the integrity check value.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 4 illustrates an example MAC frame format.

FIG. 5 illustrates an example encapsulated frame format in accordance with certain aspects of the present disclosure.

FIG. 6 illustrates an example Management MIC Information Element (MMIE).

DETAILED DESCRIPTION

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example Wireless Communication System

Figure 1:
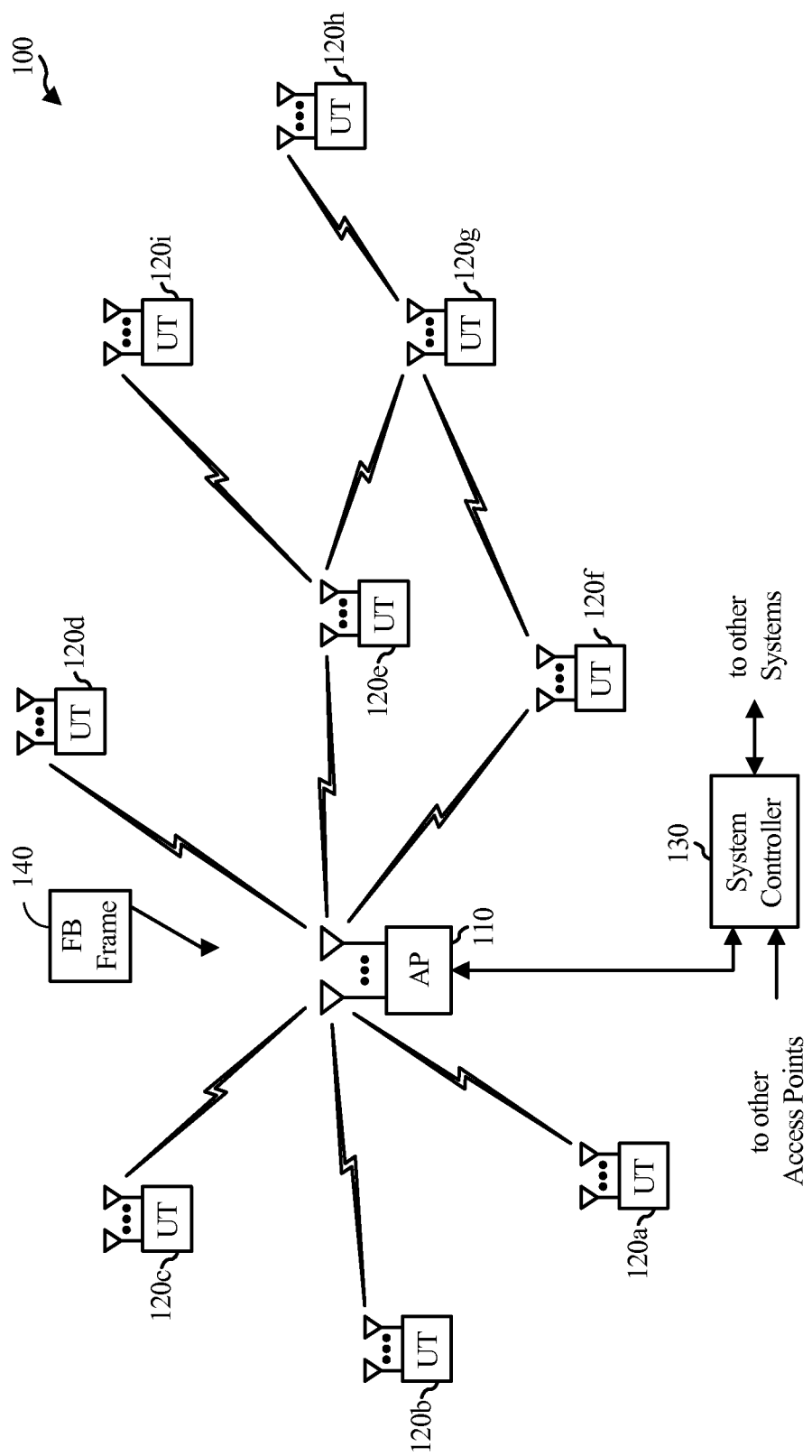
FIG. 1 illustrates an example wireless communications network in accordance with certain aspects of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device or some other terminology. A user terminal may be a wireless device, such as a cellular phone, a personal digital assistant (PDA), a handheld device, a wireless, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
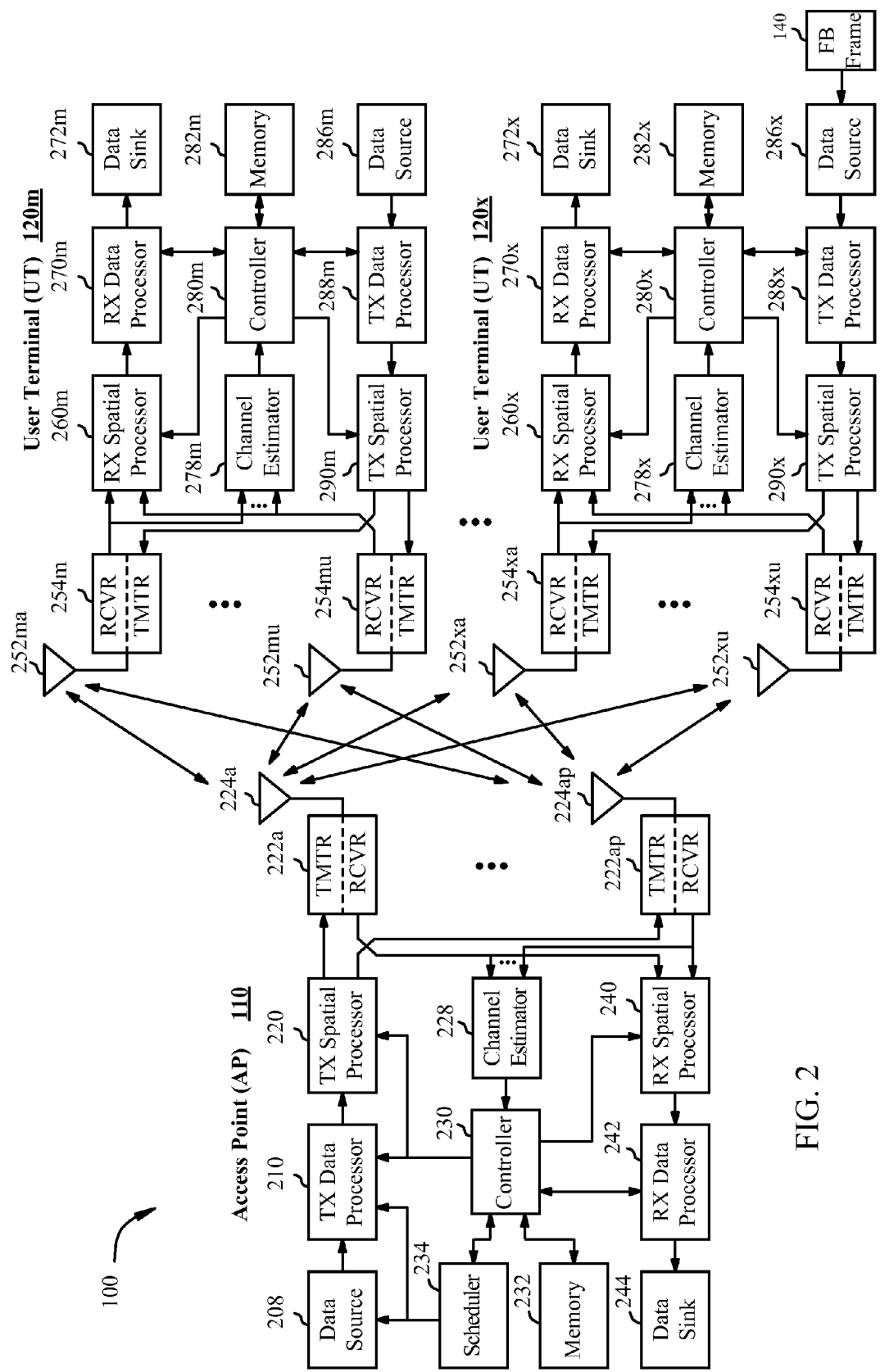
FIG. 2 illustrates a block diagram of an example of signal processing functions of a physical layer of a wireless node in the wireless communications network of FIG. 1 in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
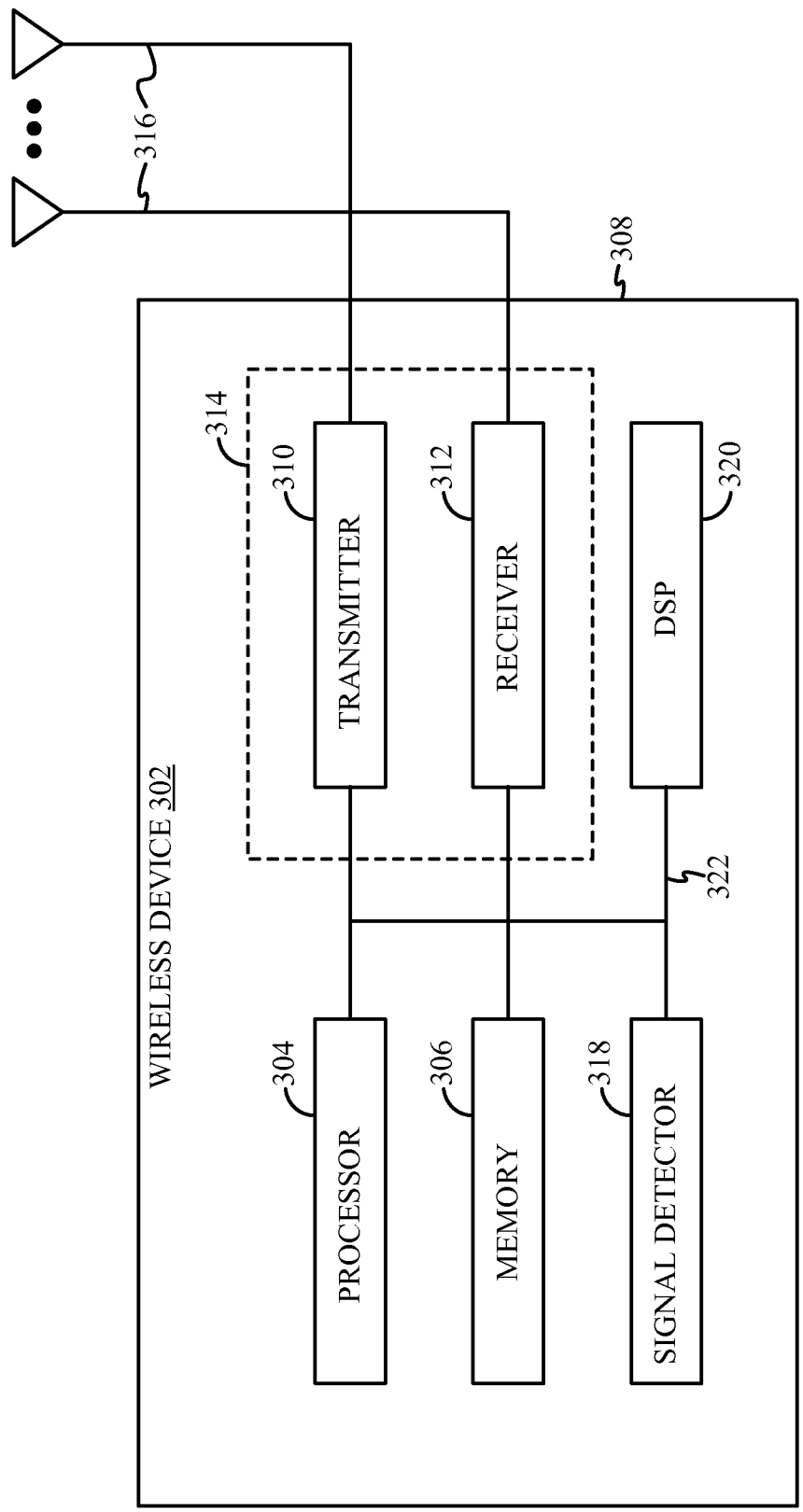
FIG. 3 illustrates a block diagram of an exemplary hardware configuration for a processing system in a wireless node in the wireless communications network of FIG. 1 in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Those skilled in the art will recognize the techniques described herein may be generally applied in systems utilizing any type of multiple access schemes, such as SDMA, OFDMA, CDMA, SDMA and combinations thereof In next generation Wireless Local Area Network (WLAN) systems based on the IEEE 802.11, an access point (AP) (e.g., the access point 110 from FIG. 1) may send data simultaneously to multiple stations (STAs) (e.g., to the user terminals 120 from FIG. 1) using multiuser multiple-input multiple-output (MU-MIMO) transmission scheme. However, prior to such transmission, the AP may send a request-to-send (RTS) message to a plurality of STAs to reserve a medium for data communication. The plurality of STAs may need to respond with clear-to-send (CTS) messages, if they are to be protected from other STAs that may not hear the RTS message sent from the AP (i.e., these other STAs may represent hidden nodes). However, the time overhead of soliciting CTS messages from each STA separately may be too large.

Beacon and Management Information Elements
With Integrity Protection

Certain aspects of the present disclosure provide support for integrity protection of information elements (IEs) transmitted in messages. For example, the techniques may provide integrity protection at an "IE-level." This IE-level integrity protection may allow integrity protection to IEs carried in types of messages that conventionally have not been afforded integrity protection (e.g., beacons).

Broadcast Integrity Protection (BIP) procedures may be available according to certain versions of a standard, such as the 802.11w amendment to the 802.11 standard, to provide integrity check and replay protection for broadcast management frames.

FIG. 4 illustrates an example management frame format 400 that may be protected via BIP. For example, the frame format 400 may be encapsulated in a BIP encapsulated frame format 500 shown in FIG. 5. According to the BIP procedure, a message integrity check (MIC) value may be generated for the encapsulated message.

As illustrated in FIG. 6, the MIC may be included in a Management MIC Information Element (MMIE) 600. The MMIE may be included with the encapsulated frame format 400 in the body of the BIP encapsulated frame format 500. As illustrated, the MMIE 600 may comprise an Element ID field, a Length Field, a KeyID, Integrity Group Transient Key (IGTK) Packet Number (IPN), and the MIC.

Typically, BIP is only available for frames that are defined as robust management frames. Unfortunately, frames that are not specifically defined as robust management frames may not be allowed to benefit from BIP.

Aspects of the present disclosure may provide integrity protection for information elements (IEs) that can be sent in various types of messages. Messages with integrity protected IEs may include beacon messages, broadcast messages (such as broadcast management messages), and/or multicast messages (such as multicast management messages).

Figure 7:
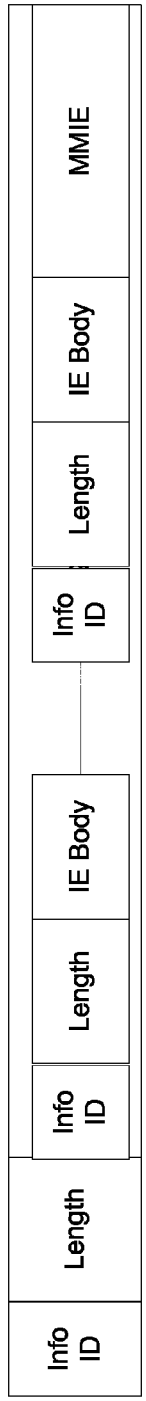
FIG. 7 illustrates an example MAC frame format.

As illustrated in FIG. 7, a frame format 700 may utilize a single IE index value to denote a BIP protected IE encapsulator. A BIP protected IE may encapsulate a plurality of other IEs and an MMIE. As illustrated, the MMIE may be the last IE.

Figure 8:
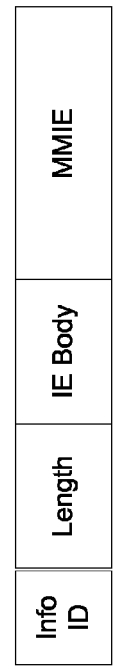
FIG. 8 illustrates how an integrity protected IE may include an Information Element augmented with an MMIE

As illustrated in FIG. 8, according to certain aspects, an integrity protected IE 800 may include an Information Element augmented with an MMIE. The MMIE may include an integrity check value (e.g., a message integrity check MIC) calculated for the IE to be protected. An optional Length field may indicate a length of the body of the IE and the MMIE. An Info ID may be set to a value corresponding to a particular information element encapsulated with the MMIE.

Figure 9:
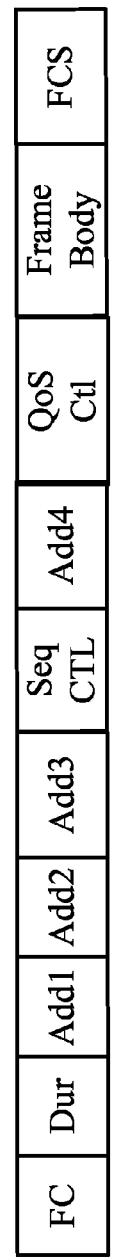
FIG. 9 illustrates an example MAC frame format.

An MMIE may be generated in a variety of different manners. As an example, with reference to the example MAC frame format 900 of FIG. 9, an MMIE may be generated based on a frame control field, one or more address fields, and an encapsulated IE with MMIE MIC bits set to zero. As another example, an MMIE may be generated based on a frame control field, one or more address fields, and part of frame body with the transmitted bits prior to the given IE with MMIE MIC bits set to zero.

According to certain aspects, an MMIE may comprise an MIC that is computed using at least one of integrity keys or security keys. For example, the MIC may be computed using Integrity keys and other parameters generated for broadcast management frames according a procedure defined by 802.11w. The integrity keys and other parameters may include the IGTK, an IPN, a KeyID.

According to certain aspects, one or more integrity protected IEs with MMIEs may be sent in a beacon message. When an MMIE is within another IE (e.g., as illustrated in FIG. 7 or 8), an Info ID field and the length field may be removed (because these fields may be redundant as the entire message may include an Info ID field and length field).

According to certain aspects, when a STA transmits a broadcast protected Information Element frame, it may select the IGTK currently active for transmission of frames to the intended group of recipients and construct the MMIE with the MIC field masked to zero and the KeyID field set to the corresponding IGTK KeyID value. The transmitter may insert a monotonically increasing nonnegative integer into the MMIE IPN field. The transmitting STA may compute AAD as specified that may be based on a frame control field and one or more address fields. The transmitting station may also compute an AES-128-CMAC over the concatenation of (AAD || IE body including MMIE), and insert the 64-bit output into the MMIE MIC field. The transmitting station may also compose the frame as the IEEE 802.11 header, management frame body, including MMIE, and FCS. As noted above, the MMIE may appear last in the frame body. The STA may then transmit the frame. AES-128 in CMAC Mode from NIST SP 800-38B refers to an encryption standard provided by the National Institute of Standards and Technology.

Figure 10:
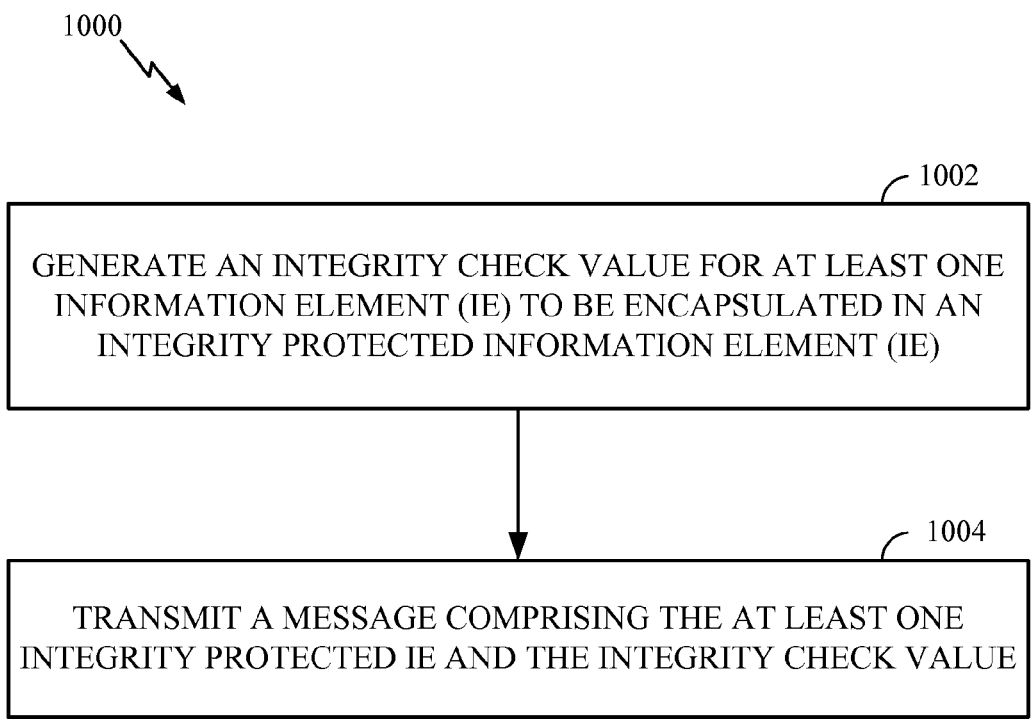
FIG. 10 illustrates example operations in accordance with certain aspects of the present disclosure.

FIG. 10 illustrates example operations 1000 that may be performed, for example, by an access point or other transmitting station.

The operations 1000 begin, at 1002, by generating an integrity check value for at least one information element (IE) to be encapsulated in an integrity protected information element (IE). At 1004, a message comprising the at least one integrity protected IE and the integrity check value is transmitted.

Figure 10A:
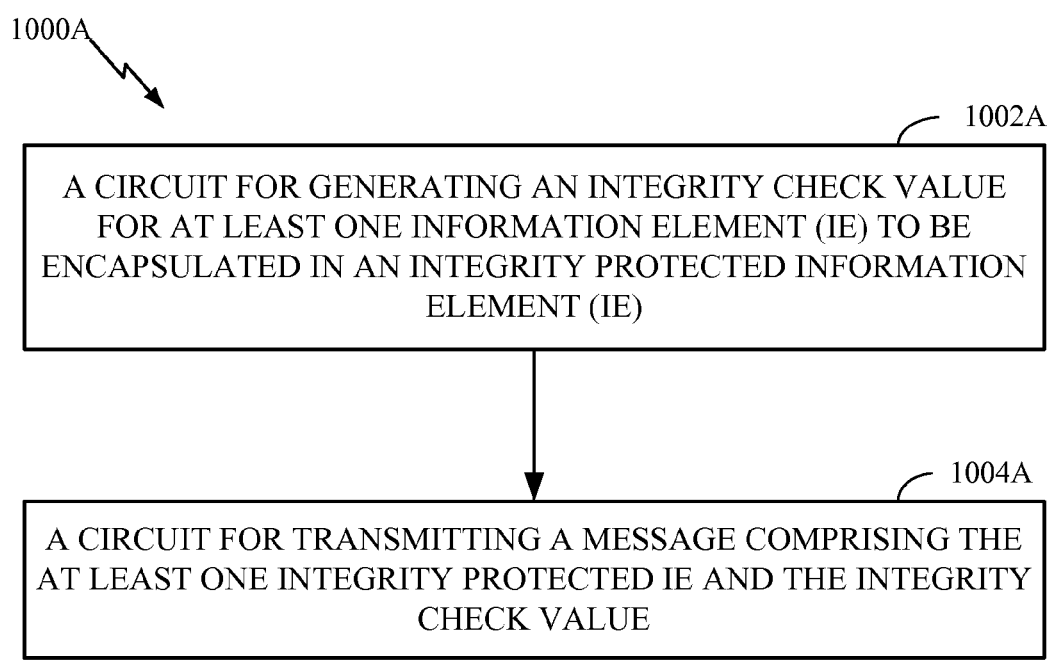
FIG. 10A illustrates example apparatus with components capable of performing the operations illustrated in FIG. 10.

FIG. 10A illustrates example components of an access point 1000A that may be capable of performing the operations shown in FIG. 10.

For example, the components may include an integrity check generator 1002A configured to generate an integrity check value for at least one information element (IE) to be encapsulated in an integrity protected information element (IE) and a transmitter 1004A configured to transmit a message comprising the at least one integrity protected IE and the integrity check value.

Figure 11:
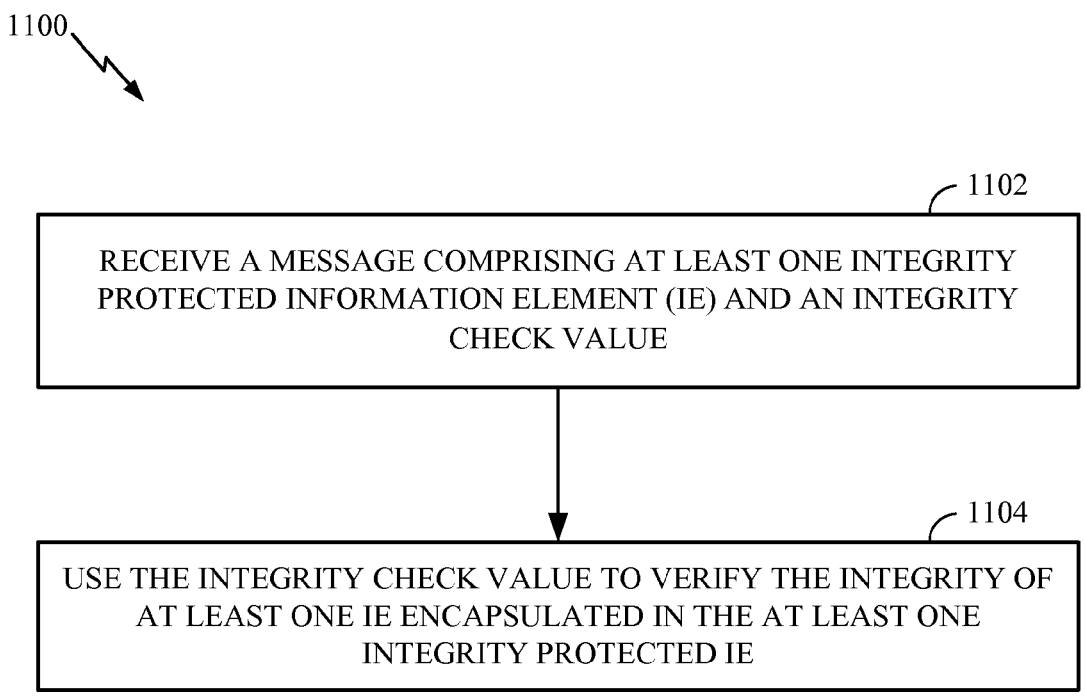
FIG. 11 illustrates example operations in accordance with certain aspects of the present disclosure.

FIG. 11 illustrates example operations 1100 that may be performed, for example, by a user terminal or other receiving wireless node. The operations 1100 are complementary to those shown in FIG. 10, allowing a receiving device to verify integrity of an IE in a received message.

The operations 1100 begin, at 1102, by receiving a message comprising at least one integrity protected information element (IE) and an integrity check value. At 1104, the integrity check value is used to verify the integrity of at least one IE encapsulated in the at least one integrity protected IE.

For example, a device performing the operations may detect a mismatch in ICVs. Further, the device may also detect a replay attach, for example, in the case that an expected sequential value is not detected, which likely indicates tampering by a third party entity.

In some cases, a receiving device may verify integrity by calculating an ICV, based on information in the received message used to calculate the ICV for the IE. This calculated ICV may be compared against the ICV received (contained) in the message which encapsulates the IE. If the ICV check fails, the receiving device may take action to cause retransmitting of the message (e.g., not sending an ACK or sending a NACK).

In some cases, the capability to perform integrity protection on IEs may be negotiated during association, based on exchanged messages indicating such capability while negotiating or previously negotiated during some other process to secure transmissions are protected against tampering by unauthorized parties.

Figure 11A:
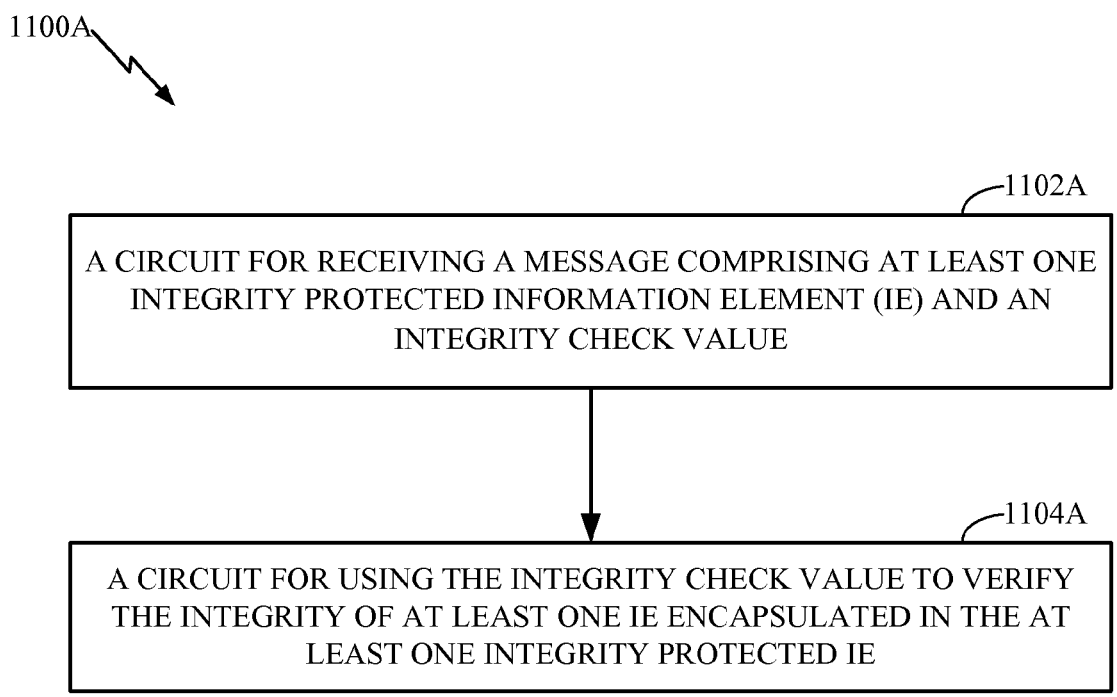
FIG. 11A illustrates example apparatus with components capable of performing the operations illustrated in FIG. 10.

FIG. 11A illustrates example components of a wireless node 1100A that may be capable of performing the operations shown in FIG. 11.

For example, the components may include a receiver 1102A configured to receive a message comprising at least one integrity protected information element (IE) and an integrity check circuit 1104A configured to use the integrity check value to verify the integrity of at least one IE encapsulated in the at least one integrity protected IE.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communications, comprising:
a processing system configured to generate an integrity check value for at least one information element (IE) to be encapsulated in an integrity protected information element (IE); and
a transmitter configured to transmit a message comprising the integrity protected IE and the integrity check value, wherein the integrity check value is contained in a Management MIC (message integrity check) Information Element (MMIE) and is generated using an integrity group transient key (IGTK).

2. The apparatus of claim 1, wherein the integrity protected IE encapsulates a plurality of IEs and the integrity check value.

3. The apparatus of claim 2, wherein the integrity check value is contained in a last IE encapsulated in the integrity protected IE.

4. The apparatus of claim 1, wherein the integrity check value is generated in a manner that provides replay protection against an unauthorized device from retransmitting a previously transmitted message.

5. The apparatus of claim 1, wherein the MMIE is generated based on the 802.11w amendment to the 802.11 standard integrity procedure.

6. The apparatus of claim 1, wherein the integrity protected IE comprises a length field indicating a length of the body of the integrity protected IE.

7. The apparatus of claim 1, wherein the integrity protected IE comprises an information ID set to a number corresponding to a particular type of the integrity protected IE.

8. The apparatus of claim 1, wherein the processing system is configured to generate the integrity check value based on at least one of a frame control field, one or more address fields, at least one encapsulated IE, or a Message Integrity Check (MIC) value with its bits set to zero.

9. The apparatus of claim 1, wherein the processing system is configured to generate the integrity check value based on at least one of a frame control field, one or more address fields, and part of a frame body with bits prior to an encapsulated IE, or a Message Integrity Check (MIC) value with its bits set to zero.

10. The apparatus of claim 1, wherein the IGTK is at least one of generated or exchanged as part of a secure association process.

11. The apparatus of claim 10, wherein the secure association process comprises negotiating a capability of integrity protection of IEs.

12. The apparatus of claim 1, wherein the message comprises at least one of a beacon message, a broadcast message, or a multicast message.

13. The apparatus of claim 1, wherein the integrity protected IE encapsulates the MMIE.

14. The apparatus of claim 1, wherein the MMIE comprises at least one of an IGTK packet number (IPN) field or a key identifier (KeyID) field.

15. A method for wireless communications, comprising:
generating an integrity check value for at least one information element (IE) to be encapsulated in an integrity protected information element (IE); and
transmitting a message comprising the integrity protected IE and the integrity check value, wherein the integrity check value is contained in a Management MIC (message integrity check) Information Element (MMIE) and is generated using an integrity group transient key (IGTK).

16. The method of claim 15, wherein the integrity protected IE encapsulates a plurality of IEs and the integrity check value.

17. The method of claim 16, wherein the integrity check value is contained in a last IE encapsulated in the integrity protected IE.

18. The method of claim 15, wherein the integrity check value is generated in a manner that provides replay protection against an unauthorized device from retransmitting a previously transmitted message.

19. The method of claim 15, wherein the MMIE is generated based on the 802.11w amendment to the 802.11 standard integrity procedure.

20. The method of claim 15, wherein the integrity protected IE comprises a length field indicating a length of the body of the integrity protected IE.

21. The method of claim 15, wherein the integrity protected IE comprises an information ID set to a number corresponding to a particular type of the integrity protected IE.

22. The method of claim 15, wherein the generating comprises generating the integrity check value based on at least one of a frame control field, one or more address fields, at least one encapsulated IE, or a Message Integrity Check (MIC) value with its bits set to zero.

23. The method of claim 15, wherein the generating comprises generating the integrity check value based on at least one of a frame control field, one or more address fields, and part of a frame body with bits prior to an encapsulated IE, or a Message Integrity Check (MIC) value with its bits set to zero.

24. The method of claim 15, wherein the IGTK is at least one of generated or exchanged as part of a secure association process.

25. The method of claim 24, wherein the secure association process comprises negotiating a capability of integrity protection of IEs.

26. The method of claim 15, wherein the message comprises at least one of a beacon message, a broadcast message, or a multicast message.

27. The method of claim 15, wherein the integrity protected IE encapsulates the MMIE.

28. The method of claim 15, wherein the MMIE comprises at least one of an IGTK packet number (IPN) field or a key identifier (KeyID) field.

29. An apparatus for wireless communications, comprising:
means for generating an integrity check value for at least one information element (IE) to be encapsulated in an integrity protected information element (IE); and
means for transmitting a message comprising the integrity protected IE and the integrity check value, wherein the integrity check value is contained in a Management MIC (message integrity check) Information Element (MMIE) and is generated using an integrity group transient key (IGTK).

30. The apparatus of claim 29, wherein the integrity protected IE encapsulates a plurality of IEs and the integrity check value.

31. The apparatus of claim 30, wherein the integrity check value is contained in a last IE encapsulated in the integrity protected IE.

32. The apparatus of claim 29, wherein the integrity check value is generated in a manner that provides replay protection against an unauthorized device from retransmitting a previously transmitted message.

33. The apparatus of claim 29, wherein the MMIE is generated based on the 802.11w amendment to the 802.11 standard integrity procedure.

34. The apparatus of claim 29, wherein the integrity protected IE comprises a length field indicating a length of the body of the integrity protected IE.

35. The apparatus of claim 29, wherein the integrity protected IE comprises an information ID set to a number corresponding to a particular type of the integrity protected IE.

36. The apparatus of claim 29, wherein the means for generating is configured to generate the integrity check value based on at least one of a frame control field, one or more address fields, at least one encapsulated IE, or a Message Integrity Check (MIC) value with its bits set to zero.

37. The apparatus of claim 29, wherein the means for generating is configured to generate the integrity check value based on at least one of a frame control field, one or more address fields, and part of a frame body with bits prior to an encapsulated IE, or a Message Integrity Check (MIC) value with its bits set to zero.

38. The apparatus of claim 29, wherein the IGTK is at least one of generated or exchanged as part of a secure association process.

39. The apparatus of claim 38, wherein the secure association process comprises negotiating a capability of integrity protection of IEs.

40. The apparatus of claim 29, wherein the message comprises at least one of a beacon message, a broadcast message, or a multicast message.

41. The apparatus of claim 29, wherein the integrity protected IE encapsulates the MMIE.

42. The apparatus of claim 29, wherein the MMIE comprises at least one of an IGTK packet number (IPN) field or a key identifier (KeyID) field.

43. A computer-program product for wireless communications, comprising a computer-readable storage device comprising instructions executable by an apparatus to:
generate an integrity check value for at least one information element (IE) to be encapsulated in an integrity protected information element (IE); and
transmit a message comprising the integrity protected IE and the integrity check value, wherein the integrity check value is contained in a Management MIC (message integrity check) Information Element (MMIE) and is generated using an integrity group transient key (IGTK).

44. An access point, comprising:
at least one antenna;
an integrity check generator configured to generate an integrity check value for at least one information element (IE) to be encapsulated in an integrity protected information element (IE); and
a transmitter configured to transmit, via the at least one antenna, a message comprising the integrity protected IE and the integrity check value, wherein the integrity check value is contained in a Management MIC (message integrity check) Information Element (MMIE) and is generated using an integrity group transient key (IGTK).

* * * * *